Figure 1:
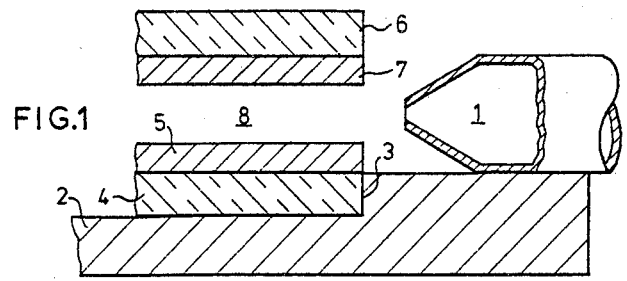

United States Patent [19]

Nolte

[11] 4,451,312

[45] May 29, 1984

[54] METHOD OF FORMING A LAMINATED FIRE SCREENING PANEL

[75] Inventor: Hans-Henning Nolte, Gelsenkirchen, Fed. Rep. of Germany

[73] Assignee: BFG Glassgroup, Paris, France

[21] Appl. No.: 133,951

[22] Filed: Mar. 25, 1980

[30] Foreign Application Priority Data

Apr. 5, 1979 [GB] United Kingdom ............... 79/12061

[51] Int. Cl.³ ............................................. B32B 17/00
[52] U.S. Cl. .................................... 156/99; 52/232; 52/789; 156/83; 156/104; 156/106; 156/182; 156/309.3; 156/381; 428/428; 428/432; 428/702; 428/913; 428/920; 428/921
[58] Field of Search ................ 156/83, 106, 99, 309.3, 156/104, 381, 182; 52/232, 789; 428/428, 539, 432, 920, 913, 921

[56] References Cited

U.S. PATENT DOCUMENTS

| | | | |
|---|---|---|---|
| 1,989,388 | 1/1935 | Watkins | 156/106 |
| 2,200,554 | 5/1940 | Kämpfer | 156/381 |
| 2,355,696 | 8/1944 | Bartell | 156/104 |
| 2,521,470 | 9/1950 | Matheson | 156/308.6 |
| 3,539,412 | 11/1970 | Miller | 156/106 |
| 3,640,837 | 2/1972 | Gaeth et al. | 428/428 |
| 3,974,316 | 8/1976 | Jacquemin et al. | 428/539 |
| 4,190,698 | 2/1980 | De Boel et al. | 428/432 |

*Primary Examiner*—John J. Gallagher
*Attorney, Agent, or Firm*—Cushman, Darby & Cushman

[57] ABSTRACT

When a laminated light transmitting fire-screening panel is formed by sandwiching at least one layer of intumescent material between at least two plies of glazing material, there is a risk that air will be entrapped between the various plies as they are bonded together.

In order to reduce such entrapment of air, the sandwich is assembled while there is present between the or each layer and any panel sheet element which is to be brought into contact therewith, an atmosphere which immediately prior to such contact consists at least in part of one or more materials which is more soluble in the intumescent material than is air, and the sandwich assembly is then subjected to heat and/or pressure to bond it together to form the laminate. Such more soluble material is preferably the vapor phase of a solvent for the intumescent material, for example water.

13 Claims, 3 Drawing Figures

U.S. Patent    May 29, 1984    4,451,312

METHOD OF FORMING A LAMINATED FIRE SCREENING PANEL

The present invention relates to a method of forming a laminated light transmitting fire screening panel comprising at least one inter-layer of intumescent material sandwiched between at least two plies of glazing material.

In order to form such a laminated panel, the plies must of course be bonded together with the intumescent material between them. When the layer is or the layers are sandwiched between the plies, the slightest disconformity between contacting surfaces will result in pockets of air being trapped within the sandwich assembly, and unless this air is removed before the panel is bonded together, it will have a deleterious effect on the optical and mechanical properties of the laminate.

It is an object of the present invention to provide a method of forming such a laminate which reduces or eliminates such entrapment of air.

According to the present invention there is provided a method of forming a laminated light transmitting fire screening panel comprising at least one inter-layer of intumescent material sandwiched between at least two plies of glazing material characterised in that the sandwich is assembled while there is present between the or each layer and any panel sheet element which is to be brought into face to face contact therewith an atmosphere which immediately prior to such contact consists at least in part of one or more materials which is more soluble in the intumescent material than is air, and in that the sandwich assembly is subjected to heat and/or pressure to bond it together to form the laminate.

The present invention thus reduces the entrapment of air within the assembly by the extent to which the air in the space or spaces between a said layer and a said ply is replaced by the more soluble material(s).

Preferably, immediately prior to said contact, said atmosphere consists of, by volume, at most 10% air and at least 90% of one or more said more soluble materials and for the best results substantially no air is present in said atmosphere immediately prior to said contact. These features respectively greatly reduce and eliminate such entrapment of air.

Having in accordance with the invention replaced part or all of the air which is or might be trapped within the assembly by one or more more soluble materials, the extent to which such more soluble material(s) will remain entrapped in pockets will depend on its or their solubility within the intumescent material. Since the material substituted into the atmosphere is more soluble than air, the amount of atmospheric material reamining entrapped in pockets within the sandwich will clearly be reduced. It is of course desirable that the material (if any) entrapped in the assembly should completely dissolve by diffusion in or by reaction with the intumescent material so that no large pockets remain after the assembly has been bonded together to form the laminate.

To this end, it is preferred that the or at least one said more soluble material is the vapour phase of a solvent for the intumescent material. When the substituted material is the vapour of a solvent for the intumescent material, it will clearly disappear into the intumescent material and it will not remain entrapped in one or more pockets in the laminate after bonding. The expression "vapour phase" is not used in its strictest sense in this specification, and it includes an atmospheric suspension of micro-droplets of the solvent. Thus for example when water vapour is present in said atmosphere as the or a said solvent vapour as is especially preferred, the expression "water vapour" is to be taken to include wet steam. Other said more soluble materials which may be used include carbondioxide and chlorine.

In order to avoid or reduce condensation of solvent vapour on contacting faces of the sandwich assembly, it is desirable that the plies and layer(s) which will form the assembly should be pre-heated though clearly not to such an extent as would cause premature intumescence of the layer(s). Heating also has the beneficial effect of softening the surface of the intumescent material, and this is found to promote bonding and the elimination of voids in the laminate after bonding.

Preferably, pressure is exerted to cause the sandwich assembly to bond together. Such pressure may for example be exerted by calendering. When all the air previously present between the plies has been replaced by one or more of said more soluble materials, mere calendering may prove sufficient to bond the assembly together as a laminate. If desired, such a calendering may be followed by, or indeed replaced by, a bonding treatment in an autoclave at super-atmospheric pressure.

If desired, the assembly may be subjected to a laminating process as described in commonly assigned U.S. Pat. No. 4,175,162 issued Nov. 20, 1979, which describes a method of manufacturing a laminated, light-transmitting, fire-screening panel comprising at least one solid layer of intumescent material sandwiched between two structural plies, characterised in that a stratum is formed from an intumescent material and it and a first structural ply are then assembled to an inorganic face of a pane comprising a second structural ply so that such stratum is in contact with said inorganic face and sandwiched between said structural plies, and further characterised in that at least the edges of the thus formed sandwich are enveloped in such manner as to define a space around the edges in which sub-atmospheric pressure can be created for subjecting the inter-ply spaces to suction at the edges to aspirate gaseous substances from said spaces, and in that the assembly is exposed to sub-atmospheric environmental pressure acting upon at least one of the main external faces of the sandwich while the sandwich is exposed to heat in a treatment chamber and the inter-ply spaces are subjected to said suction, to effect bonding of the various plies without causing said intumescent material to become tumid.

In some embodiments of the invention, one or more of said more soluble materials is or are simply blown between a said layer and a said ply as they are brought together, but preferably, said sandwich is assembled in a chamber in which said atmosphere is maintained at least during assembly.

Advantageously, said atmosphere is maintained at elevated pressure. This enables the assembly to be subjected to higher temperatures than is possible at ambient pressure without the intumescent material becoming tumid, so that a more rapid bond can be effected.

Preferably said intumescent material comprises one or more hydrated alkali metal salts. Examples of suitable hydrated alkali metal salts are aluminates, aluminium sulphates, borates, phosphates, plumbates and stannates.

Alkali metal silicates, for example sodium silicate are especially suitable for use as said intumescent material.

High quality layers of alkali metal silicate for incorporation into light transmitting fire screening panels are usually formed from an aqueous solution or suspension of the silicate material, water being caused or allowed to evaporate in order to form a solid layer.

One problem which is encountered in the formation of high quality layers of intumescent material is the appearance of microbubbles in the layer due to the presence of air which had been dissolved in the solution or suspension from which the layer was formed. Such microbubbles often appear during the later stages of the drying period, and their population tends to increase as the panel ages, even after drying has been completed. These microbubbles tend to gather and coalesce so that the resulting larger bubbles are visible to the naked eye. This is clearly objectionable in a high quality layer of intumescent material.

Accordingly, preferred embodiments of the invention are characterised in that the or at least one said layer is first formed from a body of wet intumescent material by heating it for a period of time during which water is allowed to evaporate, and in that during at least a part of the heating period there is introduced into the atmosphere in contact with the intumescent material one or more gases which is or are the vapour phase of a solvent for the body and/or one or more gases which is less soluble in the intumescent material than is oxygen.

The presence of air which could give rise to the formation of microbubbles in the dried layer can be attributed to a number of causes:
  (i) air may be present in the water originally used to make up the solution or suspension used to form the layer
  (ii) air may be introduced by agitation during mixing of the solution or suspension
  (iii) air may be introduced by agitation during pouring of solution or suspension
  (iv) air may diffuse into the layer as it stands waiting to be dried, and
  (v) air may be introduced into the layer during the drying process itself.

Operation in accordance with this preferred feature of the invention directly reduces or eliminates the introduction of atmospheric gases during the drying process and assists in the removal of atmospheric gases introduced at a previous stage.

In fact, the exact composition of the gas or gases in the microbubbles is not known with precision. It is believed that the presence of these microbubbles is in the main due to contacting of the intumescent material with atmospheric oxygen: the introduction of a said less soluble gas or such a solvent vapour has the effect of reducing the proportion of oxygen in the atmosphere in contact with the layer during drying: reducing the proportion of oxygen in the atmosphere in contact with the layer during drying promotes migration of oxygen from the layer to the atmosphere, and reduces the migration of oxygen in the opposite direction. Whether or not this theory is correct, the fact remains that operating in accordance with this preferred feature of the invention reduces and in some cases even eliminates the appearance of microbubbles in the dried layer. In fact, when using a said less soluble gas it is possible that small quantities of it will dissolve in the layer, and microbubbles of that gas may appear during aging of the panel. However, because of the smaller quantity of gas dissolved in the layer, such microbubbles as may appear will be smaller in size and number and will not have such an adverse effect on the optical quality of the layer. When using a said solvent vapour, either alone or in combination with a said less soluble gas, such solvent as may migrate into the layer can be driven off by the drying process, and in any event, its presence would not lead to microbubbles.

It is especially preferred that the atmosphere in contact with the layer during drying should consist substantially wholly of at least one such less soluble gas with optional additions of at least one said solvent vapour, since this will ensure that substantially no air is in contact with the layer during the drying period.

Preferably the same solvent vapour is present in the atmosphere in contact with the layer or layers during drying and during assembly of the sandwich since this simplifies performance of the invention.

The introduction of the vapour phase of a solvent for the layer into the atmosphere in contact with the layer might be thought to have an adverse effect on the drying period required. This is not necessarily the case, and indeed when vapour is introduced into the atmosphere as is most preferred, the drying time can actually be reduced which is highly advantageous for series production.

Wet steam is included in the expression "water vapour" as used in this specification.

When water is driven off by heating a layer of intumescent material in a dry atmosphere, there is a very steep gradient in the relative humidity of the atmosphere in the immediate vicinity of the surface of the layer, and this leads to evaporation from the surface at a rate which is often quicker than that at which water can migrate to the surface from the depths of the layer. This leads to the formation of a crust on the surface which inhibits further evaporation and thus further drying. Such a crust also has an adverse effect on optical quality of the dried layer. By drying the layer in a relatively humid atmosphere as is preferred, the tendency for such a crust to form can be reduced or eliminated. For drying at any given temperature, the rate of evaporation is reduced as the relative humidity in the atmosphere rises, and thus drying proceeds move uniformly through the thickness of the layer. This in turn means that more heat can be applied to the layer so that drying proceeds more quickly.

The invention extends to a laminated light transmitting fire screening panel made by a method as herein defined.

Figure 2:
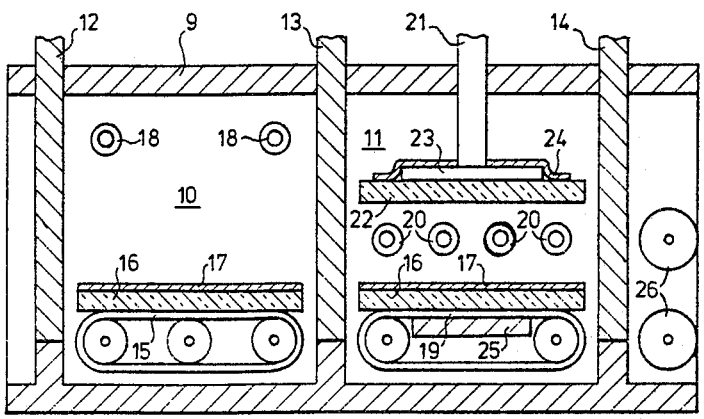
Figure 3:
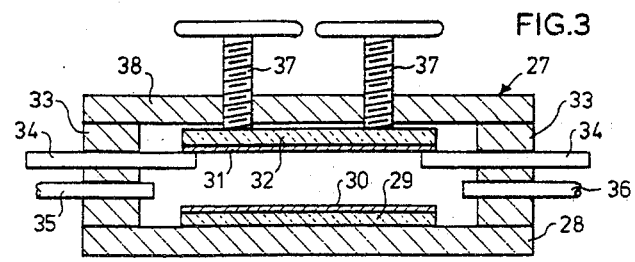

Preferred embodiments of the invention will now be described with reference to the accompanying drawings in which:

FIGS. 1 to 3 are cross-sectional diagrammatic drawings illustrating three embodiments of apparatus suitable for performing the invention.

FIG. 1 shows a gas nozzle 1 attached to one side of a table 2 which has a shoulder 3 defining an edge stop for a sheet 4 of glazing material, for example glass. The glass sheet 4 bears an intumescent layer 5 for example of sodium silicate. A second sheet 6 of glazing material also carries an intumescent layer, indicated at 7 which is spaced from the layer 5 on the first sheet 4. Immediately before the two layers are brought into contact, the space 8 between them is flushed with steam from the nozzle 1. This nozzle 1 may be one of a series of round nozzles or it may be an elongate slot nozzle so that substantially the whole of the inter-layer space 8 is flushed with steam. A shroud may be placed at the opposite side (not shown) of the table 2 to assist in extraction of excess steam. The heating effect of the steam tends to soften the surfaces of the two intumescent layers 5, 7 so that they begin to bond together as soon as they are brought into mutual contact. To the extent that air has been displaced from the inter-layer space 8 by the steam, that air cannot be entrapped between the layers on assembly of the panel. Any steam which is entrapped will dissolve into the layers 5 and 7. Because of this, and because the heating softens the surfaces of the layers 5 and 7, when they are pressed together, they will bond together to form a laminate in which, assuming that all the air previously in the inter-layer space 8 was displaced by the steam, there will be no visible pockets, whether vacuum pockets, air pockets, steam pockets or water pockets.

If desired, the table 2 may be constituted as a conveyor, for example for carriage of the assembled sandwich between calendering rolls to promote more rapid bonding.

FIG. 2 illustrates a combined apparatus for first drying an intumescent layer and then bonding such a layer into a fire-screening laminate. This apparatus comprises a tunnel 9 which is divided into a drying chamber 10 and an assembly chamber 11 by means of gates 12, 13, 14 each of which is raisable from the closed position shown into an open position and lowerable from such open position back into the closed position shown.

The drying chamber 10 contains a conveyor 15 for supporting a sheet 16 while a silicate layer 17 thereon is dried chamber 10 and is provided with one or more inlet pipes 18 of which two are shown for feeding into the drying chamber 10 one or more gases which is or are less soluble in the silicate layer 17 than is oxygen and/or the vapour phase of one or more solvents for the layer. Gas outlet pipes (not shown) are suitably provided on the opposite wall of the drying chamber 10. Means (not shown) is provided for heating the drying chamber 10 and/or the material flowing through the inlet pipes 18.

When the layer 17 has dried to the required extent, the gate 13 is raised and the sheet 16 and layer 17 are conveyed by conveyor 15 onto a conveyor 19 in the assembly chamber 11, after which gate 13 is lowered. The assembly chamber 11 is provided with one or more inlet pipes 20 for the supply of one or more materials which is more soluble in the layer 17 than is air. Gas outlet pipes (not shown) are also provided as desired. Optional heating means (not shown) may also be provided. A movable post 21 is slidably mounted in the roof of the assembly chamber and holds at its lower end a glass sheet 22. In the embodiment illustrated, the glass sheet 22 is held against a pressure plate 23 carried by the post 21 by means of a suction cup holding apparatus 24.

After the chamber 11 has been filled with the desired atmosphere, the post 21 is lowered to press the sheet 22 against the intumescent layer 17 on the sheet 16 which is on the conveyor 19. Pressure may be exerted on the thus formed panel assembly via the pressure plate 23 for as long as is desired, and the conveyor is supported against this pressure by a support plate 25 located beneath the upper reach of the conveyor. After a suitable length of time, the exit gate 14 is raised and the assembly of sheets 16, 22 with the intumescent interlayer 17 is conveyed out of the assembly between a pair of calendering rolls 26, after which gate 14 is lowered.

FIG. 3 illustrates another form of assembly chamber 27, on whose base 28 lies a sheet 29 of glazing material bearing a layer 30 of intumescent material. Positioned above this sheet 29 and layer 30 is a second intumescent layer 31 carried by a second sheet 32 which are held spaced from the first sheet 29 and layer 30 by support elements 34 slidable in the walls 33 of the chamber 27. Also located in the walls 33 are a gas inlet line 35 and an outlet line 36. After the atmosphere in the space between the two sheets and layers has reached the desired composition, the support elements 34 are slid out so that the upper sheet 32 and layer 31 can fall down onto the lower layer 30. Guide means (not shown) may be provided to ensure correct registration of the upper sheet 32 as it falls if this is desired. Following dropping of the upper sheet 32, screw clamps 37 in the roof 38 of the chamber 27 may be operated to exert bonding pressure on the assembly of sheets 29, 32 and the layers 30, 31 to cause the two layers 30, 31 to bond together onto a single layer which bonds the two sheets together.

EXAMPLE 1 (FIG. 1)

Glass sheets 4 mm in thickness were each coated with layers 5, 7 of sodium silicate dried to a residual water content of between 30 and 35% by weight and 1.1 mm thick. The sheets and layers were warmed to a temperature of approximately 105° C. and steam at about 102° C. was blown between them to displace substantially all the air between them. The sheets were then assembled together with the layers in contact, the assembly was calendered and was then allowed to cool, when it was found that the assembly was lightly bonded together as a clear transparent laminate. The bond strength of the intumescent interlayer of the laminate was found to increase over the first few weeks of its life so that the sheets became firmly bonded together.

In a variant of this Example, the lightly bonded laminate was then treated at superatmospheric pressure in an autoclave. On removal from the autoclave, the laminate was firmly bonded together.

EXAMPLE 2 (FIG. 2)

A solution of hydrated sodium silicate was poured onto a horizontal glass sheet 16 to form a layer 17 1.2 mm thick. The solution used had the following properties.

| | | |
|---|---|---|
| Weight ratio | $SiO_2:Na_2$ | = 3.4:1 |
| Density | | = 37°–40° Baume |
| Viscosity | | = 0.2 Pa s |

Entrance gate 12 was raised and the thus coated sheet 16 was conveyed into the drying chamber 10, after which gate 12 was lowered. Water vapour was introduced into the closed chamber 10 which was also heated so that the atmosphere in contact with the layer 17 during drying was maintained at 95° C. and 85% relative humidity. Drying continued for 18 hours. Because of the high relative humidity, no crust was formed on the layer 17 during drying, and because of the high temperature and reduced air content of the atmosphere, (which was at normal pressure,) almost all the air dissolved in the layer was driven off during drying, so that the incidence of microbubbles in the layer was very greatly reduced.

After drying of the layer 17, the intermediate gate 13 was raised and the coated sheet 16 was conveyed into the assembly chamber 11, after which gate 13 was lowered. A second glass sheet 22 had previously been positioned there. After heating the chamber 11 to 105° C.

steam was introduced via the inlet pipes 20 until the chamber contained an atmosphere of substantially pure steam at 105° C. The sheet 22 was then lowered onto the layer 17 and held lightly in place for a few minutes. After this, the exit gate 14 was raised and the assembly of glass sheets 16, 22 and the sandwiched interlayer passed between a pair of calendering rolls to exert light pressure on it to bond it together into a laminate. The assembly was then allowed to cool slowly.

In a variant of this Example, three sheets 16 each carrying a layer 17 on its upper surface are stacked spaced apart in the assembly chamber 11 beneath a covering sheet 22. Assembly and bonding take place under the same conditions.

EXAMPLE 3 (FIG. 2)

A sodium silicate layer of the same thickness as in Example 2 was formed in the same way and was then dried for 4 hours in the drying chamber 10 which contained an atmosphere at 4 bar of water vapour and air maintained at 140° C. The partial pressure of the water vapour was 3.4 bar.

The results given by this drying process were very similar to those given by the drying process of Example 2, apart of course from the very much shorter drying time.

While drying proceeded, a covering sheet 22 was located in the assembly chamber 11 which was then sealed and filled with pure steam at 144° C. and 4.04 bar pressure.

After the end of the drying period, the gate 13 was raised and the sheet 16 bearing its dried layer 17 was transferred to the assembly chamber. The assembly chamber was then re-sealed; the upper sheet 22 was lowered onto the layer 17 and held in place for a few minutes. Air was then pumped in until the pressure of the atmosphere contained thereby was 13 bar. This pressure and temperature was maintained for one hour, after which the chamber was allowed to cool and pressure was returned to normal over a period of half an hour. After this treatment, the two sheets 16 and 22 were firmly bonded together by the inter layer 17 of intumescent material.

EXAMPLE 4 (FIG. 3)

Glass sheets 29 and 32 respectively covered with layers 30, 31 of dried hydrated sodium silicate were placed in the assembly chamber 27 which was then heated to 105° C. while being flushed with steam. After the desired temperature and atmospheric conditions had been met, the slidable supports 34 for the upper sheet 32 were withdrawn to effect assembly of the sandwich.

Screw clamps 37 were then turned to exert bonding pressure on the sandwich, which, on removal from the chamber was found to be bonded into a laminate.

In variants of this Example, the chamber 27 is flushed with carbon dioxide, either alone or mixed with steam.

EXAMPLE 5 (FIG. 2)

In a variant of Example 2, the layer 17 was dried for 18 hours in an atmosphere of $SF_6$ maintained at 95° C. and 85% relative humidity. Again no crusting or microbubbles were observed in the intumescent layer.

After drying for the required length of time, the drying chamber 10 was heated and flushed with steam to scavenge the $SF_6$ from the atmosphere, and when the atmosphere in the drying chamber was of pure steam at 105° C., the dried layer 17 on its supporting sheet 16 was transferred to the assembly chamber 11 for assembly and bonding to the second glass sheet 22 as described in Example 2.

EXAMPLE 6

In variants of any of the preceding Examples, one of the following salts in hydrated form is substituted for the hydrated sodium silicate.
Potassium silicate
Sodium aluminate
Potassium aluminate
Sodium plumbate
Potassium plumbate
Sodium stannate
Potassium stannate
Sodium aluminium sulphate
Potassium aluminium sulphate
Sodium borate
Sodium orthophosphates
Potassium orthophosphates
Aluminium phosphate.

I claim:

1. A method of forming a laminated light transmitting fire screening panel comprising at least one inter-layer of intumescent material sandwiched between two plies of glazing material, which comprises the steps of assembling the inter-layer and any ply of glazing material which is to be brought into face-to-face contact therewith while there is present therebetween an atmosphere which immediately prior to such contact consists at least in part of one or more materials which is more soluble in the intumescent material than is air, and subjecting the sandwich assembly to heat and/or pressure to bond it together to form the laminate.

2. A method as defined in claim 1 wherein immediately prior to said contact, said atmosphere consists of, by volume, at most 10% air and at least 90% of one or more said soluble materials.

3. A method as defined in claim 2 wherein substantially no air is present in said atmosphere immediately prior to said contact.

4. A method as defined in claim 1, 2 or 3 wherein said more soluble material is the vapor phase of a solvent for the intumescent material.

5. A method as defined in claim 4 wherein water vapor is present in said atmosphere as the solvent vapor.

6. A method as defined in claim 1, 2 or 3 wherein said pressure is exerted by calendering the sandwich assembly to cause it to bond together.

7. A method as defined in claim 1, 2 or 3 wherein said sandwich is assembled in a chamber in which said atmosphere is maintained at least during assembly.

8. A method as defined in claim 7 wherein said atmosphere is maintained at elevated pressure.

9. A method as defined in claim 1, 2 or 3 wherein said intumescent material comprises one or more hydrated alkali metal salts.

10. A method as defined in claim 9 wherein said intumescent material comprises an alakli metal silicate.

11. A method as defined in claim 1, 2 or 3 wherein said layer is first formed from a body of wet intumescent material by heating it for a period of time during which water is allowed to evaporate and wherein during at least a part of the heating period there is introduced into the atmosphere in contact with the intumescent material a gas which is the vapor phase of a solvent for the body, and/or a gas which is less soluble in the intumescent material than is oxygen.

12. A method as defined in claim 11 wherein the same solvent vapor is present in the atmosphere in contact with the layer during drying and during assembly of the sandwich.

13. A method as defined in claim 11 wherein said solvent is water.

* * * * *